United States Patent
Sullivan et al.

(10) Patent No.: US 10,844,841 B2
(45) Date of Patent: Nov. 24, 2020

(54) TRANSPORTATION FIXTURES FOR WIND TURBINE BLADES

(71) Applicants: Andrew J. Sullivan, Bedford, TX (US); Alberto J. Alvarez, Fort Worth, TX (US)

(72) Inventors: Andrew J. Sullivan, Bedford, TX (US); Alberto J. Alvarez, Fort Worth, TX (US)

(73) Assignee: BNSF Logistics, LLC, Springdale, AR (US)

( * ) Notice: Subject to any disclaimer, the term of this patent is extended or adjusted under 35 U.S.C. 154(b) by 175 days.

(21) Appl. No.: 16/110,868

(22) Filed: Aug. 23, 2018

(65) Prior Publication Data
US 2020/0063715 A1    Feb. 27, 2020

(51) Int. Cl.
*F03D 13/40* (2016.01)
*B60P 7/13* (2006.01)

(52) U.S. Cl.
CPC ............... *F03D 13/40* (2016.05); *B60P 7/13* (2013.01); *B60P 7/132* (2013.01); *F05B 2220/30* (2013.01); *F05B 2260/02* (2013.01)

(58) Field of Classification Search
CPC ...... B60P 3/40; B60P 3/41; B60P 7/12; F03D 13/40; F03D 80/00
USPC ...... 410/46, 32, 80, 97, 155, 44, 92, 91, 82; 416/244 R, 246, 5, 61; 180/53.1, 55.1, 180/137.3, 131, 127
See application file for complete search history.

(56) References Cited

U.S. PATENT DOCUMENTS

| | | | |
|---|---|---|---|
| 7,303,365 B2 | 12/2007 | Wobben | |
| 7,591,621 B1 | 9/2009 | Landrum et al. | |
| 7,670,090 B1 | 3/2010 | Landrum et al. | |
| 7,744,318 B2 | 6/2010 | Wobben | |
| 8,342,491 B2 * | 1/2013 | Jorgensen | F03D 13/40 269/17 |
| 8,602,700 B2 * | 12/2013 | Johnson | F03D 13/40 410/44 |
| 8,641,339 B2 * | 2/2014 | Schibsbye | B60P 3/40 410/45 |
| 8,708,625 B1 | 4/2014 | Landrum et al. | |
| 8,834,082 B1 | 9/2014 | Landrum et al. | |
| 8,961,085 B2 | 2/2015 | Ressel et al. | |
| 8,985,920 B2 | 3/2015 | Bitsch et al. | |
| 9,011,054 B2 | 4/2015 | Thomsen | |
| 9,315,200 B1 | 4/2016 | Landrum et al. | |
| 9,347,426 B2 | 5/2016 | Landrum et al. | |

(Continued)

FOREIGN PATENT DOCUMENTS

EP    2708731 A2    3/2014
KR    10-2016-0058544    5/2016

*Primary Examiner* — D Glenn Dayoan
*Assistant Examiner* — Sunsurraye Westbrook
(74) *Attorney, Agent, or Firm* — Dan Brown Law Office; Daniel R. Brown (57) ABSTRACT

Fixtures for supporting wind turbine blades that have a root end flange, which may be interconnected with twistlock fasteners and stacked for use in plural modes of transportation, including ocean transportation. A root fixture includes a bearing that rotatably engages a mounting flange adapter that is coupled to the blade's root flange. A bearing pivot is coupled to the bearing to allow the blade to pivot during loading, unloading and transport. A tip stand assembly is provided to engage the blade along a tip end support region.

15 Claims, 8 Drawing Sheets

(56) References Cited

U.S. PATENT DOCUMENTS

| | | | |
|---|---|---|---|
| 9,494,140 B2 | 11/2016 | Sigurdsson | |
| 9,567,969 B2 | 2/2017 | Sugurdsson | |
| 9,738,458 B2 | 8/2017 | Schmidt et al. | |
| 9,790,927 B1 | 10/2017 | Landrum et al. | |
| 2005/0031431 A1 | 2/2005 | Wobben | |
| 2008/0296903 A1* | 12/2008 | Todorof | F03D 1/00 290/55 |
| 2010/0143062 A1* | 6/2010 | Tobergte | B60P 3/40 410/44 |
| 2012/0213636 A1* | 8/2012 | Gallant | F03D 1/0625 416/182 |
| 2013/0315685 A1* | 11/2013 | Pedersen | B60P 3/40 410/44 |
| 2014/0050547 A1* | 2/2014 | Hiremath | F03D 13/40 410/44 |
| 2014/0064870 A1 | 3/2014 | Thomsen | |
| 2017/0253167 A1* | 9/2017 | Gill, III | B60P 3/00 |

\* cited by examiner

TRANSPORTATION FIXTURES FOR WIND TURBINE BLADES

BACKGROUND OF THE INVENTION

Related Applications

None.

Field of the Invention

The present invention relates to securing wind turbine blades for transportation via plural transportation modes. More particularly, the present invention relates to a root end support fixtures particularly useful in ocean vessels, barges, railcars, and trucks.

DESCRIPTION OF THE RELATED ART

The continued growth of wind power utilization has led to increasingly larger wind turbine structures. This has presented a number of challenges in the field of logistics for transporting wind turbine components from the points of manufacturer to the points of utilization. Since the distances involved are of a global scale, various modes of transportation are routinely employed, including ocean vessels, barges, railroads and trucks. In the particular case of wind turbine blades, which are very large and relatively fragile, various support fixtures have been developed to facilitate efficient and economical transportation, including intermodal systems of transportation.

The assignee of the present disclosure holds a range of US patents that are germane to the logistics of wind turbine blade transportation. These patents are listed below, and the entire contents and teachings of all of these patents are hereby incorporated by reference, and in their entirety, for all purposes.
- A) U.S. Pat. No. 7,591,621 issued on Sep. 22, 2009 to Landrum et al. for Wind Turbine Blade Transportation System and Method.
- B) U.S. Pat. No. 7,670,090 issued on Mar. 2, 2010 to Landrum et al. for Wind Turbine Blade Transportation System and Method
- C) U.S. Pat. No. 8,708,625 issued on Apr. 29, 2014 to Landrum et al. for Wind Turbine Blade Railroad Transportation System and Method
- D) U.S. Pat. No. 8,834,082 issued on Sep. 16, 2014 to Landrum et al. for Wind Turbine Blade Railroad Transportation System and Method
- E) U.S. Pat. No. 9,315,200 issued on Apr. 19, 2016 to Landrum et al. for Wind Turbine Blade Railroad Transportation With Two Axis Translation
- F) U.S. Pat. No. 9,347,426 issued on May 24, 2016 to Landrum et al. for Wind Turbine Blade Railroad Transportation System and Method
- G) U.S. Pat. No. 9,494,140 issued on Nov. 15, 2016 to Sigurdsson for Frame Support Assembly For Transporting Wind Turbine Blades
- H) U.S. Pat. No. 9,567,969 issued on Feb. 14, 2017 to Sigurdsson for Systems and Methods For Transporting Wind Turbine Blades
- I) U.S. Pat. No. 9,790,927 issued on Oct. 17, 2017 to Landrum et al. for Wind Turbine Blade Double Pivot Transportation System and Method The logistics of transporting wind turbine blades changes depending on the mode of transportation involved. For example, in ocean transport, the designers will prefer to closely pack a large number of wind turbine blades together so as to maximize the quantity that can be placed onto a single ship, while carefully considering the logistics of loading and off-loading. For rail transport, the designer will be concerned with railway clearance issues, particularly acute in curved sections of railways, given the remarkably long lengths involved with modern wind turbine blades. In the case of truck transport, the clearance issues are even more acute, with overhead clearance being highly problematic given the presence of bridges, underpasses, and utility easement clearance limitations.

It should be noted that the fixtures, stands, bolsters, and other attachment equipment used to transport wind turbine blades represent a substantial cost factor and present opportunities for streamlining logistics of wind turbine blade transportation, and controlling costs of doing such. It is desirable to use such devices across various modes of transportation where possible, as this saves on equipment cost and reduces the amount of handling required during intermodal operations. Thus it can be appreciated that there is a need in the art for improved systems and methods for transporting wind turbine components using various modes of transportation.

SUMMARY OF THE INVENTION

The need in the art is addressed by the system and methods of the present invention. An illustrative embodiment of the present disclosure teaches a system for supporting a wind turbine blade on a transportation vehicle, where the wind turbine blade has a root end with a mounting flange, and a tip end support region. The system includes a tip stand assembly configured to engage the transportation vehicle and support the wind turbine blade along the tip end support region, and, a root stand assembly configured to engage the transportation vehicle, and having a bearing assembly. A mounting flange adapter has a hub assembly with a spindle that rotatably engages the bearing assembly, and has plural spokes extending from the hub assembly, where each of the plural spokes has an attachment plate at its distal end for attachment to the mounting flange of the wind turbine blade, which thereby rotatably supports the root end of the wind turbine blade.

In a specific embodiment of the foregoing system, the tip stand assembly includes a tip stand frame with at least a first twistlock casting fixed to a corner thereof for engaging the tip stand assembly to the transportation vehicle, and the tip stand assembly includes at least a first sling hung from the tip stand frame for supporting the tip end support region of the wind turbine blade, and, the root stand assembly includes a root stand frame with at least a first twistlock casting fixed to a corner thereof for selectively engaging the root stand assembly to the transportation vehicle.

In a specific embodiment of the foregoing system, the root stand assembly includes a root stand frame, and, the bearing assembly includes a bearing plate with an opening formed therethrough for receiving the spindle, and also has a cradle bearing disposed about a portion of the opening. In a refinement to this embodiment, the system further includes a bearing pivot assembly positioned between the root stand frame and the bearing assembly that enables the bearing assembly to pivot with respect to the root stand frame, which enables pivotal movement of the wind turbine blade during loading, unloading, and transport thereof. In a further refinement to this embodiment, the bearing pivot assembly further includes at least a first pivot bearing coupled to at least a first pivot pin, and at least a first pivot pin end block for retaining the at least a first pivot pin.

In a specific embodiment of the foregoing system, the mounting flange adapter hub assembly further includes a hub plate coupled between plural proximal ends of the plural spokes, and the spindle extends from the hub plate, and the hub plate has a plurality of indexing holes formed therethrough for selectively locating the mounting flange adapter at an angular position with respect to the root stand assembly, which thereby locates the wind turbine blade at a selected angular position with respect to the transportation vehicle. In a refinement to this embodiment, the system further includes a thrust washer disposed about the spindle and adjacent the hub plate for engaging the bearing plate of the bearing assembly, and the thrust washer is fabricated from a low friction polymeric material.

The present disclosure teaches a fixture for supporting a wind turbine blade, which has a mounting flange at its root end, on a transportation vehicle. The fixture includes a root stand frame that engages the transportation vehicle and has a bearing assembly coupled to it. Also, a mounting flange adapter with a hub assembly that has a spindle that rotatably engages the bearing assembly, and has plural spokes extending from the hub assembly, each of the plural spokes has an attachment plate at its distal end for engaging the mounting flange of the wind turbine blade, so as to rotatably support the root end of the wind turbine blade. This fixture also includes a bearing pivot assembly coupled between the root stand frame and the bearing assembly to enable the bearing assembly to pivot with respect to the root stand frame, which enables a range of pivotal movement of the wind turbine blade during loading, unloading, and transport thereof.

In a specific embodiment, the foregoing fixture further includes twistlock castings fixed to its corners for selectively engaging the root stand frame with the transportation vehicle. In another specific embodiment, the bearing assembly further includes a bearing plate with an opening formed therethrough for receiving the spindle, and a cradle bearing disposed about a portion of the opening.

In a specific embodiment of the foregoing fixture, the bearing pivot assembly further includes at least a first pivot bearing coupled to at least a first pivot pin, and at least a first pivot pin end block for retaining the at least a first pivot pin.

In a specific embodiment of the foregoing fixture, the mounting flange adapter hub assembly further includes a hub plate coupled between plural proximal ends of the plural spokes, and the spindle extends from the hub plate. Also, the hub plate has a plurality of indexing holes formed through it for selectively locating the root adapter at an angular position with respect to the root stand assembly, to thereby locate the wind turbine blade at a selected angular position with respect to the transportation vehicle. In a refinement to this embodiment, the fixture further includes a thrust washer disposed about the spindle and adjacent the hub plate for engaging the bearing plate of the bearing assembly, and, the thrust washer is fabricated from a polymeric material.

The present disclosure teaches a method of supporting a wind turbine blade on a transportation vehicle, where the wind turbine blade has a root end with a mounting flange and a tip end support region, using a tip stand assembly, a root stand assembly that has a bearing assembly, and a mounting flange adapter with a hub assembly that has a spindle and having plural spokes extending from the hub assembly where each spoke has an attachment plate at its distal end. The method includes the steps of engaging the root stand assembly to the transportation vehicle, engaging the tip stand assembly to the transportation vehicle, attaching the mounting flange adapter to the mounting flange of the wind turbine blade using the plural attachment plates, rotatably engaging the spindle of the hub assembly with the bearing assembly, selecting a rotational position of the wind turbine blade with respect to the transportation vehicle, and then supporting the wind turbine blade with the tip stand assembly along the tip end support region.

In a specific embodiment of the foregoing method, the tip stand assembly and the root stand assembly each include plural twistlock casting positioned at their corners, and the method further includes engaging the root stand assembly to the transportation vehicle using twistlock fasteners and engaging the tip stand assembly to the transportation vehicle using first twistlock fasteners.

In a specific embodiment of the foregoing method, where the bearing assembly includes a bearing plate with an opening formed therethrough and a cradle bearing disposed about a portion of the opening, the method further includes engaging the spindle of the mounting flange adapter with the cradle bearing. In a refinement to this embodiment, where the root stand assembly includes a root stand frame and a bearing pivot assembly disposed between the root stand frame and the bearing assembly, the method further includes enabling the bearing assembly to pivot with respect to the root stand frame, thereby enabling a range of pivotal movement of the wind turbine blade during loading, unloading, and transport thereof.

In a specific embodiment of the foregoing method, where the mounting flange adapter hub includes a hub plate coupled between plural proximal ends of the plural spokes, and where the spindle extends from the hub plate, and where the hub plate has a plurality of indexing holes formed therethrough, the method further includes selectively locating the mounting flange adapter at an angular position with respect to the root stand assembly, thereby locating the wind turbine blade at a selected angular position with respect to the transportation vehicle.

The present disclosure teaches a system for supporting plural wind turbine blades on a transportation vehicle, where the wind turbine blades each have a root end with a mounting flange, and a tip end support region. The system includes plural tip stand assemblies, each having a sling hung therefrom to support one of the plural wind turbine blades along the tip end support region, and where each tip stand assembly has twistlock castings fixed to plural corners for selective engagement to the transportation vehicle or for selective engagement with other tips stand assemblies, and, plural root stand assemblies, each having a bearing assembly, and each having twistlock castings fixed to plural corners thereof for selective engagement to the transportation vehicle or for selective engagement with other root stand assemblies, and, plural mounting flange adapters, each having a hub assembly with a spindle configured to rotatably engage the bearing assembly in a corresponding one of the plural root stand assemblies, and each having plural spokes extending from the hub assembly, each of the plural spokes having an attachment plate at a distal end thereof for engaging the mounting flange of a corresponding one of the wind turbine blades, to thereby rotatably support the root end of the wind turbine blade, and wherein the plural tip stand assemblies and the plural root stand assemblies are interconnectable to one another and to the transportation vehicle using plural twistlock fasteners.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope hereof and additional fields in which the present invention would be of significant utility.

In considering the detailed embodiments of the present invention, it will be observed that the present invention resides primarily in combinations of steps to accomplish various methods or components to form various apparatus and systems. Accordingly, the apparatus and system components, and method steps, have been represented where appropriate by conventional symbols in the drawings, showing only those specific details that are pertinent to understanding the present invention so as not to obscure the disclosure with details that will be readily apparent to those of ordinary skill in the art having the benefit of the disclosures contained herein.

In this disclosure, relational terms such as first and second, top and bottom, upper and lower, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a" does not, without more constraints, preclude the existence of additional identical elements in the process, method, article, or apparatus that comprises the element.

A reference to an element in the singular is not intended to mean "one and only one" unless specifically stated, but rather "one or more." Pronouns in the masculine (e.g., his) include the feminine and neuter gender (e.g., her and its) and vice versa. The term "some" refers to one or more. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the this description. No clause element is to be construed under the provisions of 35 U.S.C. § 112 unless the element is expressly recited using the phrase "means for" or, in the case of a method clause, the element is recited using the phrase "step for."

While this written description contains many specifics, these should not be construed as limitations on the scope of what may be described, but rather as descriptions of particular embodiments of the subject matter. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described as acting in certain combinations and even initially described as such, one or more features from a described combination can in some cases be excised from the combination, and the described combination may be directed to a sub-combination or variation of a sub-combination.

The Title, Background, Brief Description of the Drawings, Abstract, and Drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the described subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately described subject matter.

The present disclosure addresses the problems in the art referenced hereinbefore, particularly directed to fixtures for supporting wind turbine blades during plural modes of transportation, and including considerations for transferring between different modes of transportation, and transferring the fixtures along with the wind turbine blades. Wind turbine blades may be referred to herein simply as "blades." The ability to stack the blades compactly is provided by the fixtures taught herein. Acknowledging the limitations of differing modes of transportation, the fixtures provided herein enable operators to rotate the orientation of the blades to best suit each particular mode of transportation. By way of example, and not meant as a limitation to use, a horizontal orientation may be advantageous for ocean transport, while a vertical orientation may be advantageous for rail transport. The fixtures also provide a degree of pivot at the root end of the blades, to facilitate insertion and stacking of the fixtures during loading and unloading. The pivot feature is also beneficial during transport, such as during rail or truck transport where the fixtures may experience dynamic misalignment.

Figures 1, 2:
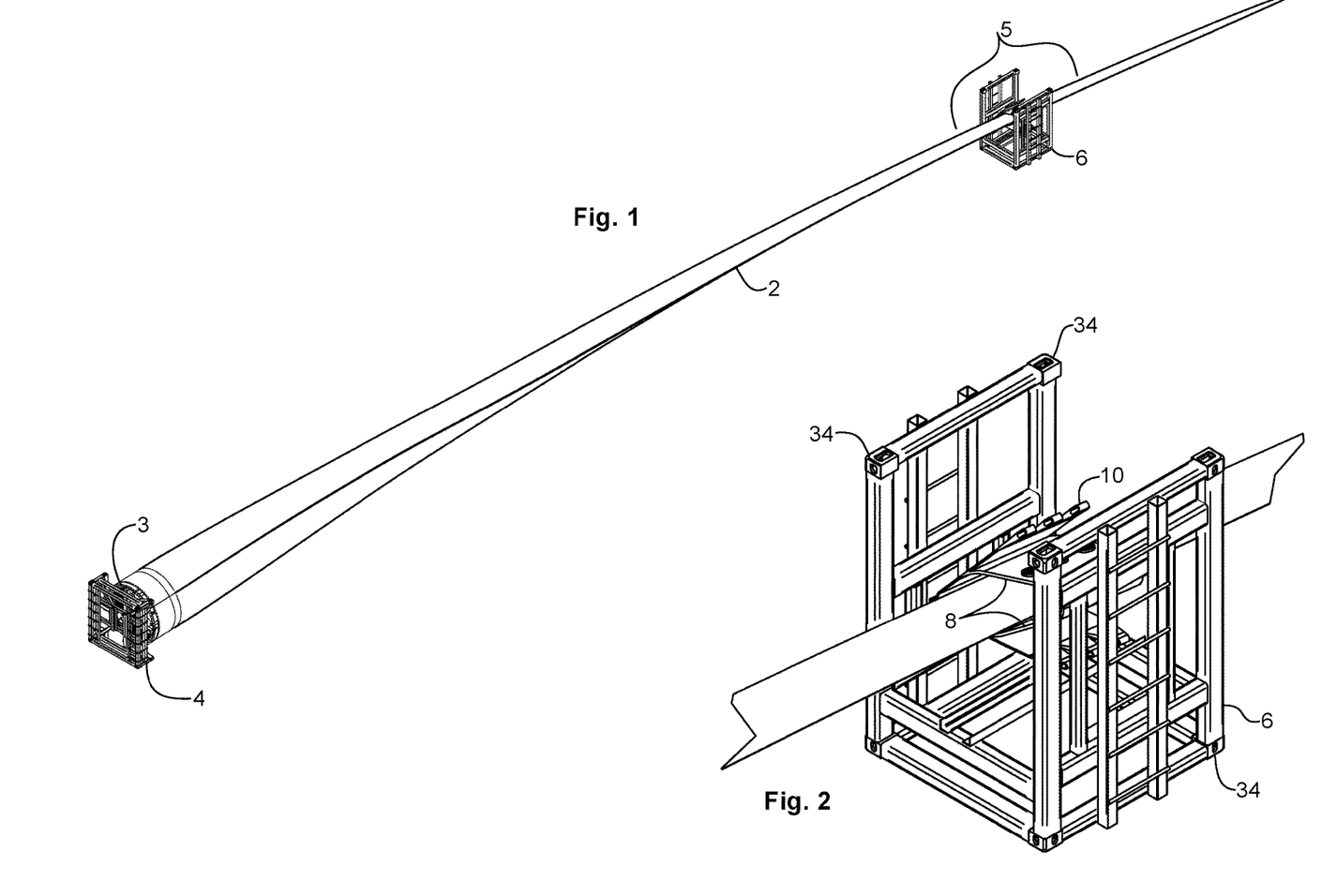
FIG. 1 is a perspective view drawing of a wind turbine blade on a pair of support stands according to an illustrative embodiment of the present invention.
FIG. 2 is a perspective view drawing of a wind turbine blade tip stand assembly with blade support slings according to an illustrative embodiment of the present invention.

Reference is directed to FIG. 1, which is a perspective view drawing of a wind turbine blade 2 on a pair of support fixtures 4, 6 according to an illustrative embodiment of the present invention. Modern wind turbine blades have reached lengths in excess of fifty meters, and continue to increase in length as demand for wind energy increases. In the present disclosure, fifty-six meter blades are contemplated, however, the teachings herein are applicable to blades of any length presently utilized, or which may be utilized in the future, regardless of length. The root support fixture 4 is positioned at the end of the blade 2, and is connected to a root end flange 3, which will be more fully discussed hereinafter. Toward the tip end of the blade 2, is a tip stand 6. The exact position of the tip stand 6 is determined by the particular blade 2 that is to be supported. The blade manufacturers generally provide a reinforced section 5 along the length of the blade 2, generally close to the tip end, which is referred to herein as the tip end support region 5, as will be understood by those skilled in the art. Note that both support stands 4, 6, comprise a plurality of twist lock castings, typically located at the corners, which facilitate fastening and interconnection to a transport vehicle, or to other stands that may be utilized in a particular loading.

Reference is directed to FIG. 2, which is a perspective view drawing of a wind turbine blade tip stand 6 assembly with blade support slings 8, 10 according to an illustrative embodiment of the present invention. The blade tip stand assembly 6 is fabricated from structural steel components and provides the structure from which the blade 2 is supported above a transportation vehicle, such as the deck of a ship or barge, a railroad car, or a truck. There are a number of techniques employed to support an irregularly shaped blade 2, as is evidence by the prior art discussed in the Background section of the present disclosure (supra). In this embodiment, a pair of slings 8, 10 are hung from the tip support stand 6, which serve to retain and support the blade 2, as well as conforming to the irregular shape of the blade 2. Note that this approach is beneficial for this embodiment because the teachings herein enable the blade 2 to be rotated to different orientations depending on the mode of transport. The flexible slings 8, 10 will accommodate the rotated profile of the blade, yet prevent damage to the blade. The slings 8, 10 can be fabricated from polymeric webbing, or other flexible belt-like material. Note also the presence of twistlock casting 34 at the corners of the tip stand 6.

Twistlock fasteners are well known in the shipping and logistics arts, and are particularly prevalent in containerized shipping systems. A "twistlock" and "corner casting" together form a standardized rotating connector for securing shipping containers. The primary uses are for locking a container into place on container ship, semi-trailer truck or railway container train; and for lifting of the containers by container cranes and sidelifters. In this disclosure, the two parts of the twistlock system are referred to as the "twistlock casting" and the "twistlock fastener," which is utilized to join two twistlock casting together, as will be appreciated by those skilled in the art. The female part of the connector is the 7×7×4½ inches (180×180×110 mm) corner casting, which is fitted to the support stands, and has no moving parts, only an oval hole in the bottom and/or sides and top. The hole is an oval 4.9 inches (124.5 mm) on the long axis with two flat sides 2.5 inches (63.5 mm) apart. The male component is the twistlock fastener, which may fitted to a transport vehicle, or between adjacent twistlock castings. These can be inserted through the hole (it is roughly 4.1 inches or 104.1 mm long and 2.2 inches or 55.9 mm wide), and then the top portion (normally pointed to make insertion easier) is rotated 90° so that it cannot be withdrawn. The maximum size and position of the holes in the connector are defined in international standard ISO 1161:1984. The tensile strength of a twistlock is rated at either 20 or 25 tons.

Figure 3:
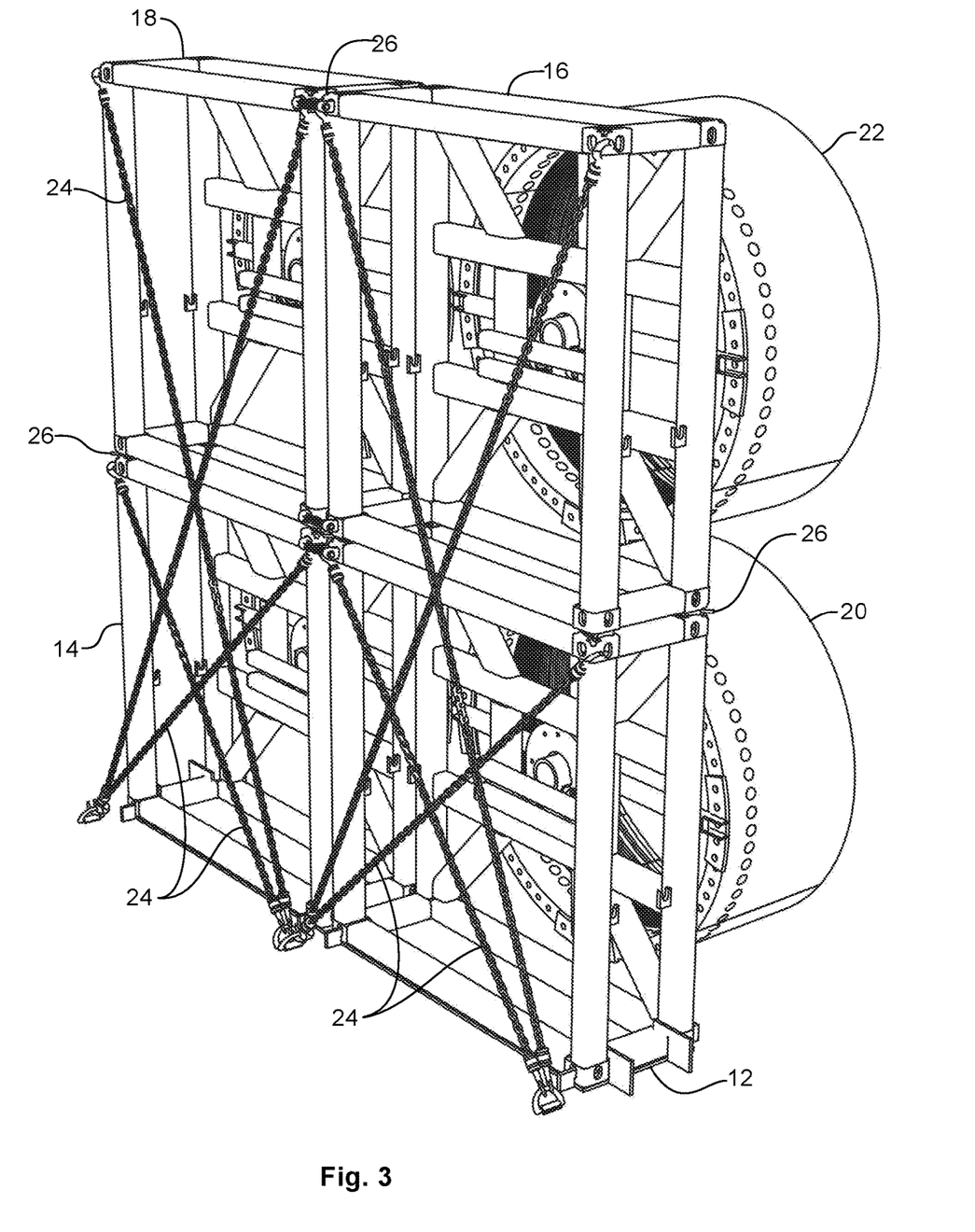
FIG. 3 is a perspective view drawing of plural wind turbine blade root stands coupled together with twistlock fasteners according to an illustrative embodiment of the present invention.

Reference is directed to FIG. 3, which is a perspective view drawing of plural wind turbine blade root stands 12, 14, 16, 18 coupled together with twistlock fasteners 26 according to an illustrative embodiment of the present invention. This is an example of tightly packing four wind turbine blades (blades 20 and 24 are illustrated) together for efficient utilization of the transport vehicle area, space, and volume. Blades 20 and 22 are supported at their respective root ends by support stands 12 and 16, respectively. The other two blades are not visible in this perspective view, but would be supported by stands 14 and 18. Suitable lashing 24 is used to stabilized the load, as will be understood by those skilled in the art. The tip stand assemblies (not shown) would also be stacked and interlocked together in like fashion. On a large ocean vessel, there may be dozens of wind turbine blades carried in a single shipment, and they may be stack many layers deep and many columns wide.

Figure 4:
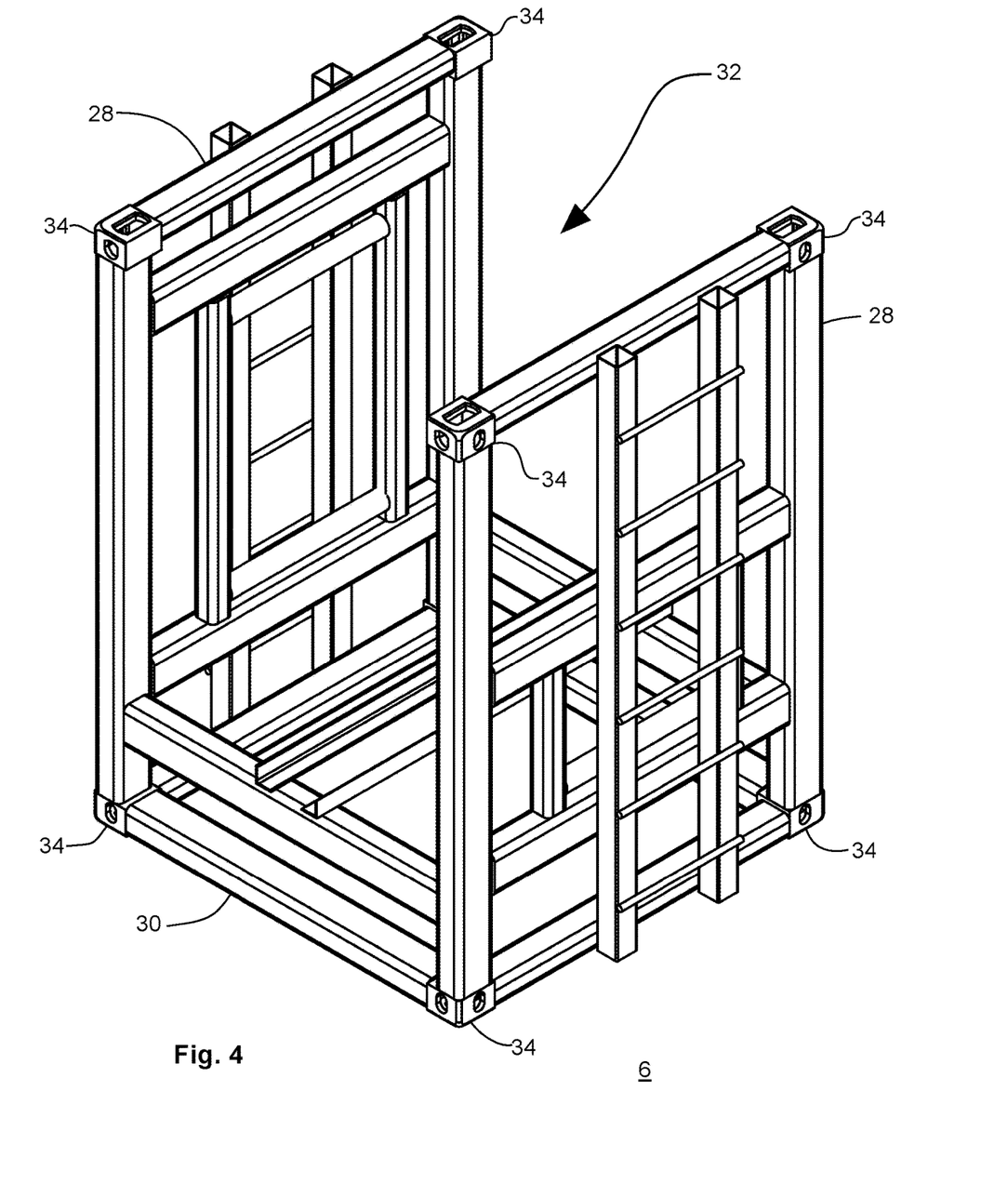
FIG. 4 is a perspective view drawing of a wind turbine blade tip stand assembly according to an illustrative embodiment of the present invention.

Reference is directed to FIG. 4, which is a perspective view drawing of a wind turbine blade tip stand assembly 6 according to an illustrative embodiment of the present invention. The tips stand assembly 6 is fabricated from mild steel structural members that are welded together as illustrated. Higher strength structural materials may be employed where appropriate, such as for supporting heavier loads or deeper levels of stacking. Corrosion resistant materials can also be employed. A base structure 30 joins a pair of upright structures 28 that define a open area 32 therebetween, into which the tip end support region of the wind turbine blade (not shown) is located, and supported by flexible slings (not shown). Note that in this illustrative embodiment, all of the corners of the structure are fitted with twistlock castings 34 to facilitate interconnection.

Figure 5:
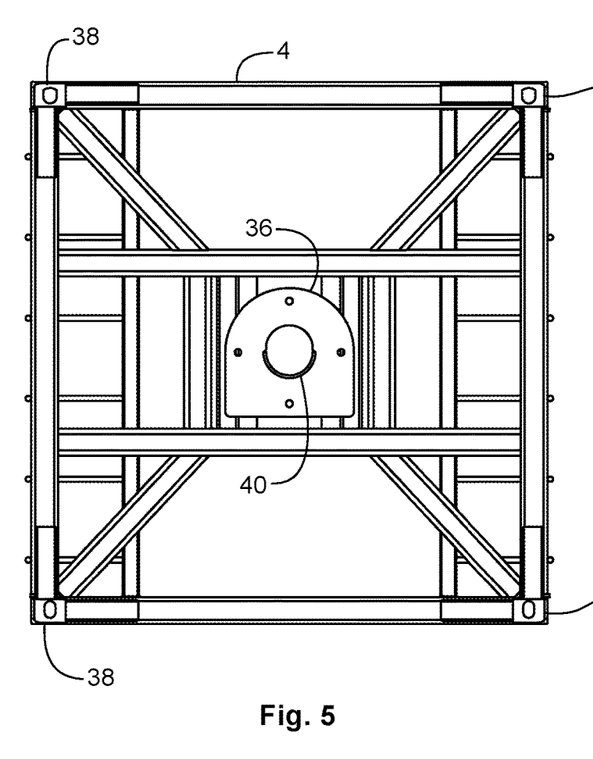
FIGS. 5, 6, and 7 are end view, top view, and side view drawings, respectively, of a wind turbine blade root stand assembly according to an illustrative embodiment of the present invention.
Figure 6:
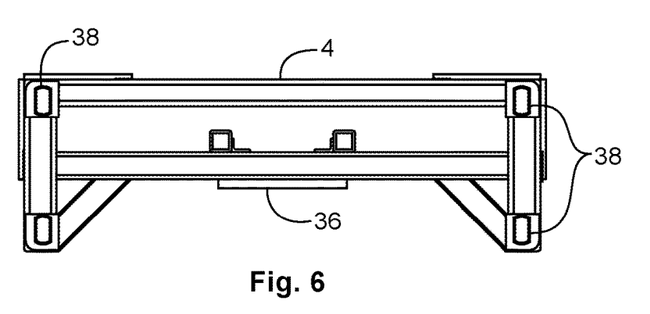
Figure 7:
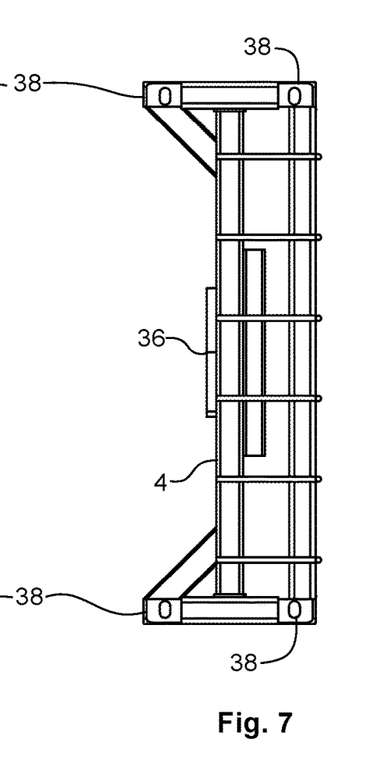

Reference is directed to FIGS. 5, 6, and 7, which are end view, top view, and side view drawings, respectively, of a wind turbine blade root stand assembly 4 according to an illustrative embodiment of the present invention. The root stand assembly 4 is fabricated from mild steel structural members that are welded together as illustrated. Higher strength structural materials may be employed where appropriate, such as for supporting heavier loads or deeper levels of stacking. Corrosion resistant materials can also be employed. Note that in this illustrative embodiment, all of the corners of the structure 4 are fitted with twistlock castings 38 to facilitate interconnection. A bearing assembly 37 is located on the face of the structure 4, and provides a support location for the mounting flange adapter (not shown), which supports, in turn, the root end of a wind turbine blade (not shown). The bearing assembly 37 comprises a bearing plate 36 and a cradle bearing 40. The bearing plate 36 is provided with a bearing pivot assembly (not shown) that enables the bearing assembly 37 to pivot with respect to the root end frame structure 4. This bearing assembly details will be more fully discussed hereinafter.

Figure 8:
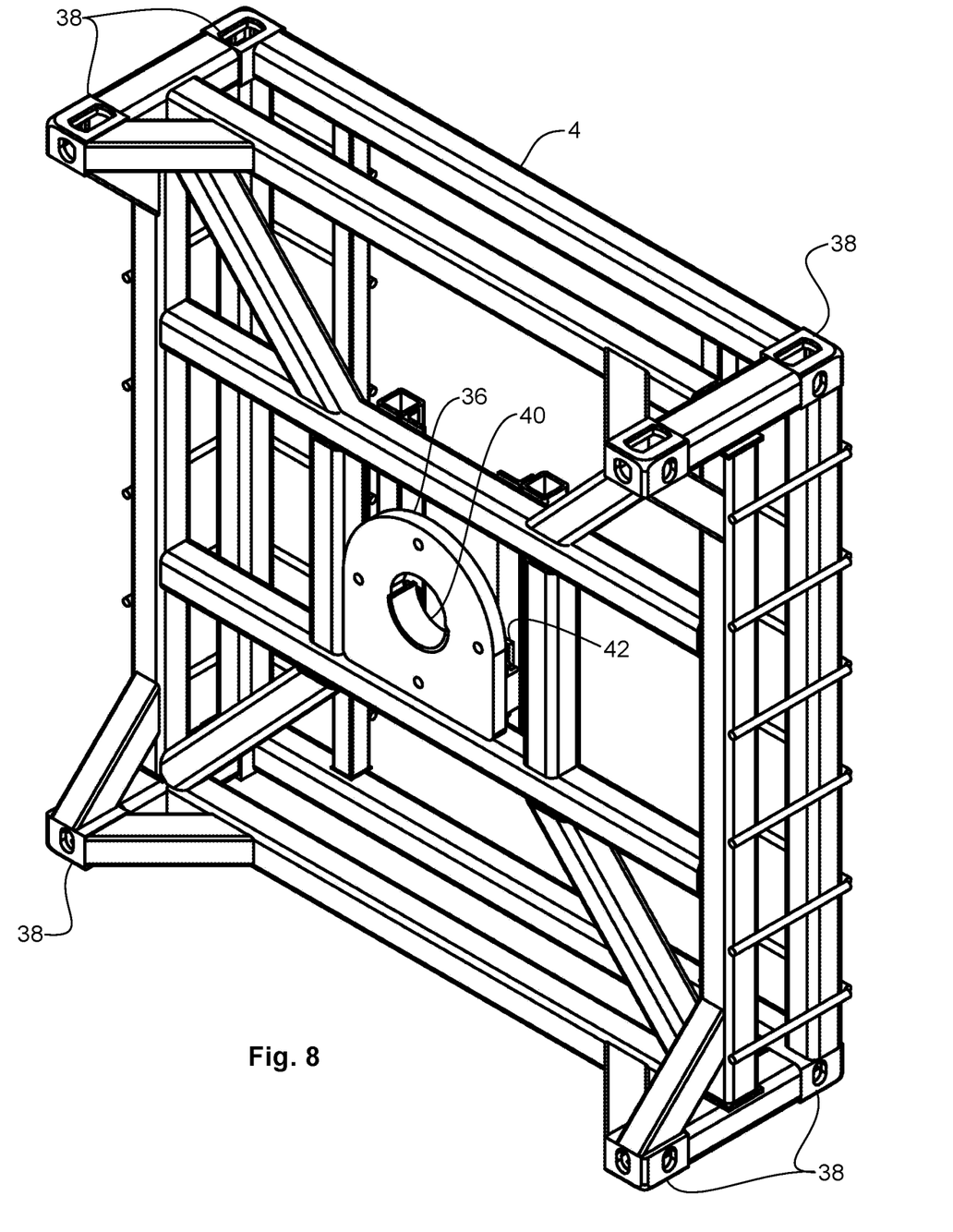
FIG. 8 is perspective view drawing of a wind turbine blade root stand assembly according to an illustrative embodiment of the present invention.

Reference is directed to FIG. 8, which is perspective view drawing of a wind turbine blade root stand assembly 4 according to an illustrative embodiment of the present invention. As discussed with respect to FIGS. 5, 6, and 7, FIG. 8 also illustrates the structural arrangement, including twistlock castings 38 located at all corners of the frame. The bearing assembly 37 is illustrated on the face of the stand 4, and includes the bearing plate 36 and cradle bearing 40. The bearing pivot assembly 42 is partially visible in this perspective view. The bearing pivot assembly will be more fully discussed hereafter.

Figures 9, 10, 11A, 11B, 12:
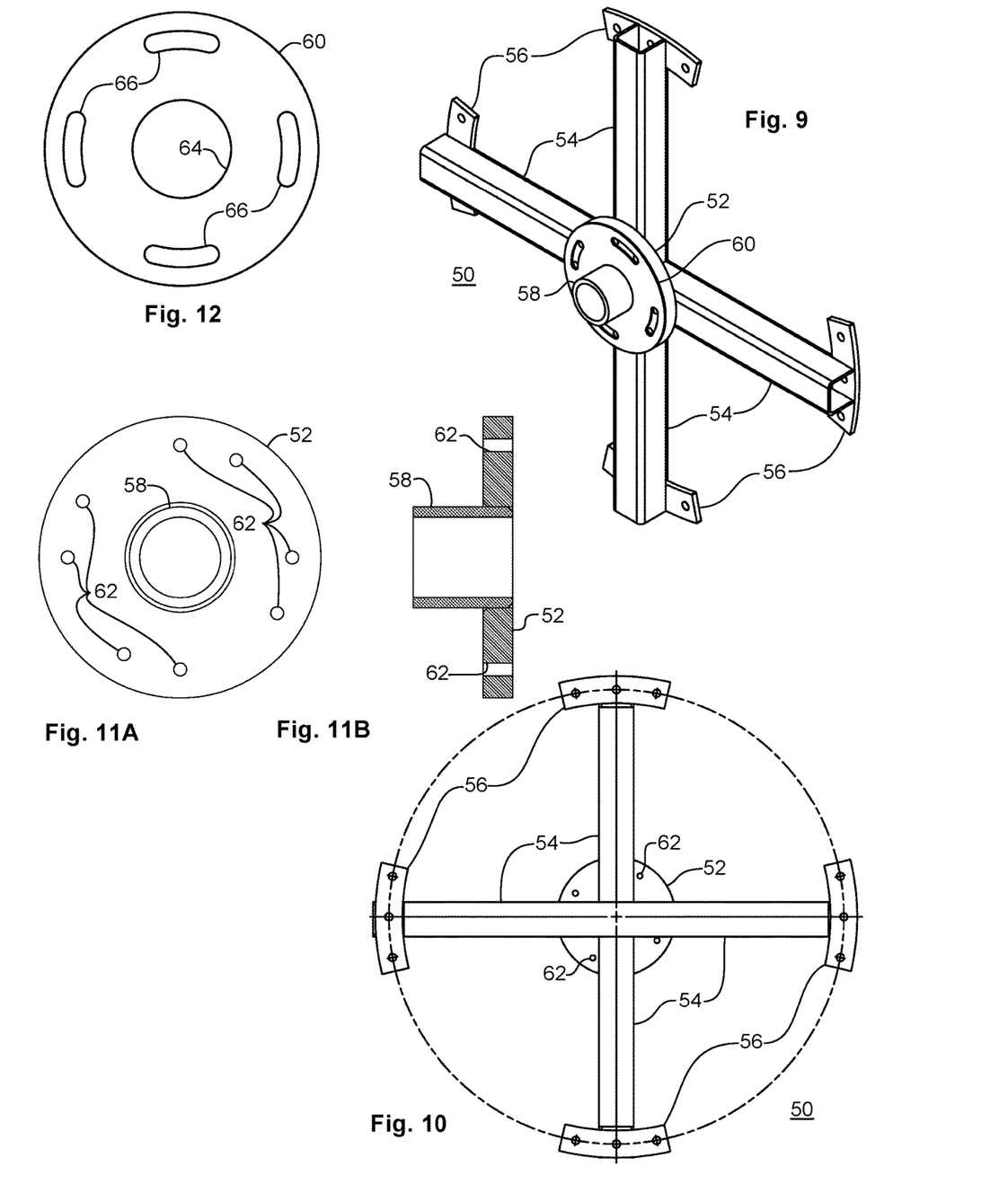
FIG. 9 is a perspective view drawing of a wind turbine blade mounting flange adapter according to an illustrative embodiment of the present invention.
FIG. 10 is an end view drawing of a wind turbine blade mounting flange adapter according to an illustrative embodiment of the present invention.
FIGS. 11A and 11B are a end view drawing and section view drawing, respectively, of a hub assembly for a wind turbine blade mounting flange adapter according to an illustrative embodiment of the present invention.
FIG. 12 a drawing of a thrust washer for a wind turbine blade mounting adapter according to an illustrative embodiment of the present invention.

Reference is directed to FIG. 9, which is a perspective view drawing of a wind turbine blade mounting flange adapter 50 according to an illustrative embodiment of the present invention. The mounting flange adapter 50 is disposed between the bearing assembly (not shown) of the root stand (not shown) and the root end of a wind turbine blade (not shown). A hub plate 52 supports plural spokes 54 that extend radially therefrom. In the illustrative embodiment, the spokes 54 are fabricated from structural tubing. The proximal end of each spoke 54 is welded to the hub plate 52, and each spoke has an attachment plate 56 at its distal end, which includes bolt holes for attachment to the root end flange of the wind turbine blade (not shown). The hub plate 52 is generally sized to engage the bearing plate (not shown) of the root stand (not shown). The hub plate 52 has a spindle 58 extending therefrom for supportively engaging the cradle bearing (not shown of the root stand assembly (not shown). In the illustrative embodiment, the spindle 58 is a section of round structural tubing. A polymeric washer 60 is disposed against the face of the hub plate 52 prior to engagement with the root stand (not shown).

Reference is directed to FIG. 10, which is an end view drawing of a wind turbine blade mounting flange adapter 50 according to an illustrative embodiment of the present invention. This view is from the opposite side as compared to FIG. 9. In FIG. 10, the hub plate 52 is illustrated with the plural spokes 54 extending therefrom. The attachment plates 56 at the distal ends of the spokes 54 are illustrated, together with the plural bolt holes 57 for attachment to the root end of the wind turbine blade (not shown). Note that plural mounting holes 62 are provided in the hub plate for fixedly attaching the mounting flange adapter 50 to the root stand assembly (not shown) once a suitable angular position therebetween has been selected.

Reference is directed to FIGS. 11A and 11B, which are a end view drawing and section view drawing, respectively, of a hub assembly 52, 68 for a wind turbine blade mounting flange adapter according to an illustrative embodiment of the present invention. This drawing depicts the hub assembly portions 52, 58 without the spokes so as to illustrate the structure more clearly. The hub plate 52 is a substantial steel disc with a central hole where the spindle 58 is welded into place. This base structure 52, 58 carries the entire weight of the root end of the wind turbine blade (not shown). Note that the hub plate 52 is drilled with four sets of hole pairs 62, which are positioned in preselected spacing to define two rotational positions for the mounting flange adapter with respect to the root stand assembly (not shown). This enables the system to accommodate two such positions. Of course, there could be plural additional sets holes provided so as to define any reasonable number of angular positions. In the illustrative embodiment, there are two sets of holes 62 pairs, one for ocean transport optimization and one for rail transport optimization.

Reference is directed to FIG. 12, which a drawing of a thrust washer 60 for a wind turbine blade mounting adapter 50 according to an illustrative embodiment of the present invention. The trust washer is positioned about the spindle 58 between the hub plate 52 and bearing plate (not shown) 36. This washer 60 is fabricated from a polymeric material having good lubricity and wear characteristics, such as UHMW polyethylene. Those skilled in the art will appreciate that there are other suitable polymeric materials that might also function acceptably well. Note that washer 60 has a central hole 64 formed therethrough for accommodating the spindle. The washer 60 also includes four arcuate slots 66 positioned to straddle the hole pairs 62 in the hub plate 52. The slot feature enables the washer to accommodate both of the aforementioned loading angles.

Figure 13:
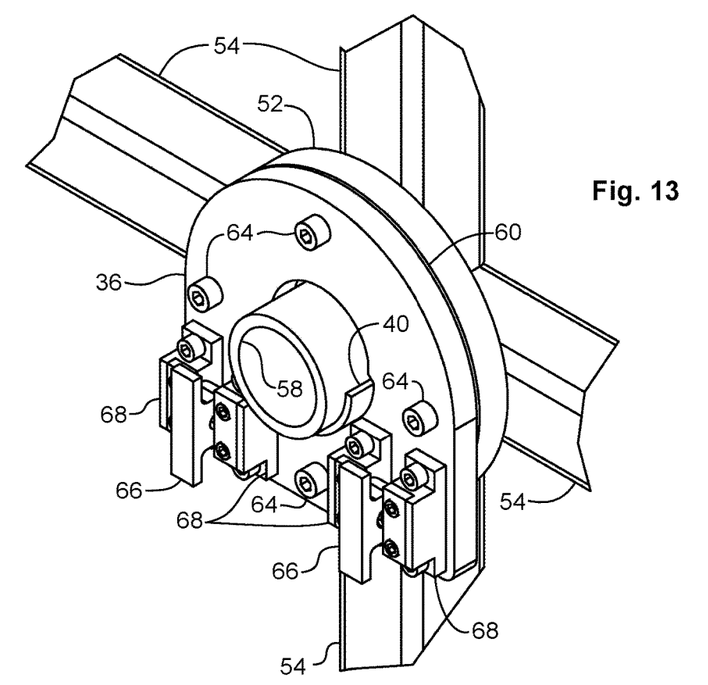
FIG. 13 is perspective view drawing of a bearing and hub assembly according to an illustrative embodiment of the present invention.
Figure 14A:
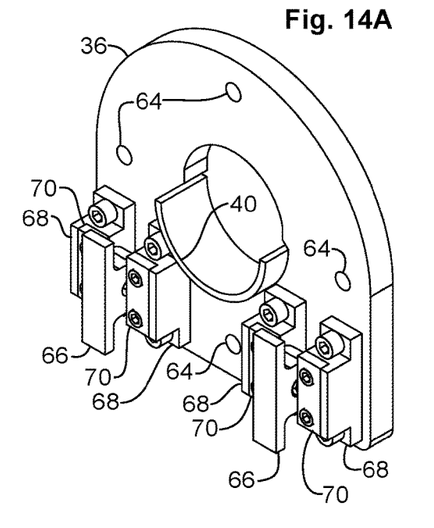
FIGS. 14A and 14B are drawings of a bearing pivot assembly according to an illustrative embodiment of the present invention.
Figure 14B:
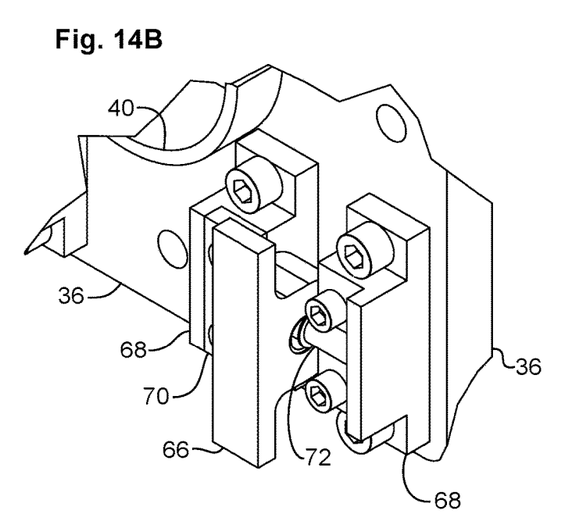

Reference is directed to FIG. 13, which is perspective view drawing of a bearing and hub assembly, and FIGS. 14A and 14B, which are drawings of a bearing pivot assembly according to an illustrative embodiment of the present invention. These drawings illustrate both the engagement between the mounting flange adapter and the root stand bearing assembly, and also the bearing pivot assembly (item 42 in FIG. 8). In FIG. 13, the hub plate 52 with the plural spokes 54 are illustrated. The spindle 58 extends from the hub plate 52, through washer 60, through the bearing plate 36, and rests on the cradle bearing 40 that is welded to the bearing plate 36. This structure carries the load of the root end of the wind turbine blade (not shown), yet enables rotation of the blade through this hub and bearing arrangement. The bearing plate 36 is attached to the root stand assembly (not shown) through the bearing pivot assemblies 42.

The bearing pivot assemblies 42 in FIGS. 13, 14A, and 14B enables the bearing plate 36 and hub plate 52 to pivot together about a horizontal axis so that the position of the wind turbine blade can move vertically out at the tip end support. This not only facilitates vertical differences along the transportation route, such as a train cresting a hill, but also facilitates loading, unloading, and alignment of the assemblies as the blades are loaded and unloaded. This function is enabled using a pair of pivot bearings 66, which are fixed to the root stand (not shown). A pair of pivot pins 72 are rotatably supported by the pivot bearings 66. The pivot pins 66 are each further located by a pair of pivot pin end blocs 68, which are fixed to the bearing plate 36. The pivot pins 72 are retained to the pivot pin end blocks 68 using respective end block clamps 70. Thusly, the bearing plate 36 is enabled to rotate about the horizontal axis defined by the pivot pins 72.

Figure 15:
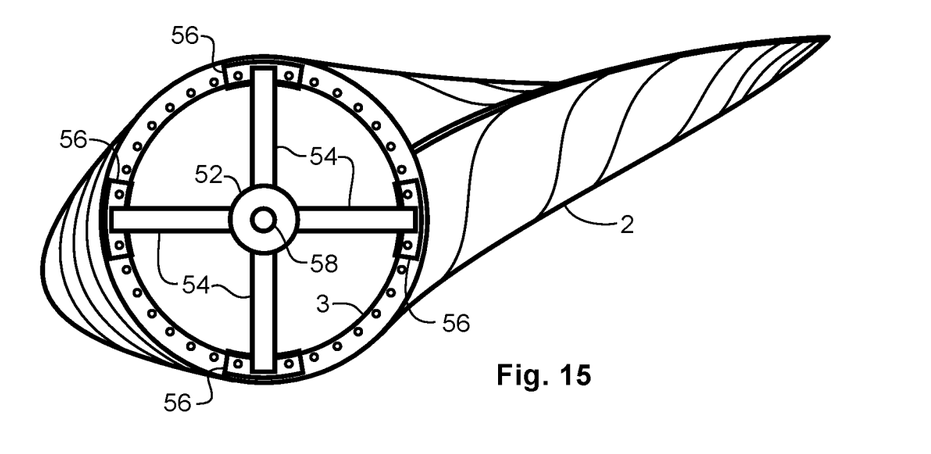
FIG. 15 is an end view drawing of a mounting flange adapter engaged with the rood end flange of a wind turbine blade according to an illustrative embodiment of the present invention.
Figure 16:
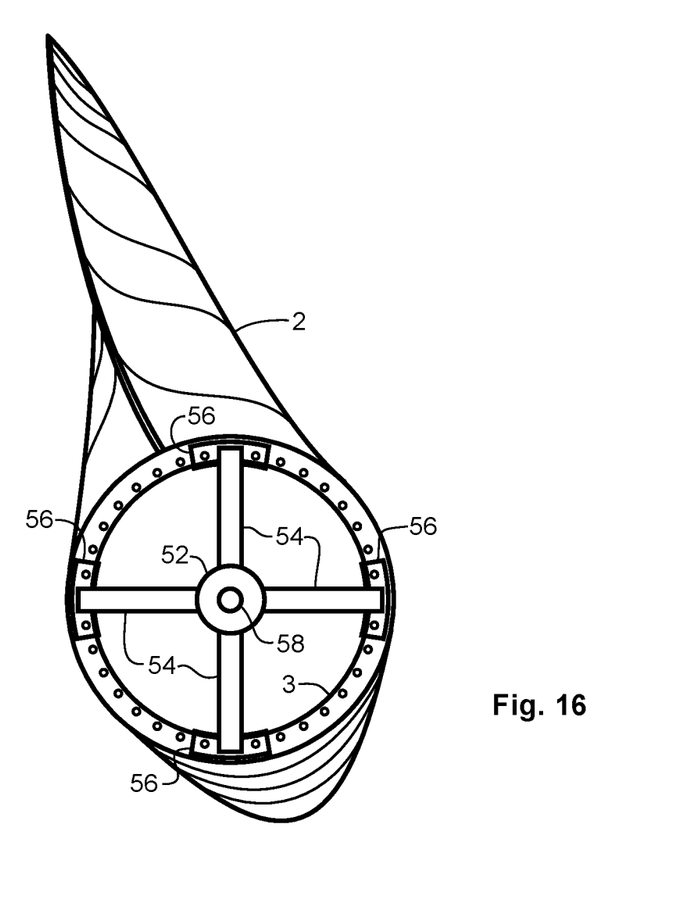
FIG. 16 is an end view drawing of a mounting flange adapter engaged with the rood end flange of a wind turbine blade according to an illustrative embodiment of the present invention.

Reference is directed to FIG. 15 and FIG. 16, which are an end view drawing of a mounting flange adapter 50 engaged with the root end flange 3 of a wind turbine blade 2 according to an illustrative embodiment of the present invention. As can be seen in these drawings, the position of the wind turbine blade is rotated by virtue of the teachings of the present disclosure. In FIG. 15, a generally horizontal blade positing is shown, which may be suitable for ocean transport where there is adequate horizontal clearance and where plural blades may be stacked. FIG. 16 illustrates a generally vertical blade arrangement, which is useful where horizontal clearance is limited, such as may be the case with rail transport. Of course, any angular orientation is possible, depending on the logistics needs of the mode of transportation at issue.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A system for supporting a wind turbine blade on a transportation vehicle, the wind turbine blade having a root end with a mounting flange, and a tip end support region, the system comprising:
   a tip stand assembly configured to engage the transportation vehicle and support the wind turbine blade along the tip end support region;
   a root stand assembly configured to engage the transportation vehicle, and having a bearing assembly, and
   a mounting flange adapter having a hub assembly with a spindle configured to rotatably engage said bearing assembly, and having plural spokes extending from said hub assembly, each of said plural spokes having an attachment plate at a distal end thereof for engaging the mounting flange of the wind turbine blade, to thereby rotatably support the root end of the wind turbine blade, and wherein
   said mounting flange adapter hub assembly included a hub plate coupled between plural proximal ends of said plural spokes, and wherein said spindle extends from said hub plate, and wherein said hub plate has a plurality of indexing holes formed therethrough for selectively locating said mounting flange adapter at an angular position with respect to said root stand assembly, to thereby locate the wind turbine blade at a selected angular position with respect to the transportation vehicle, and
   a thrust washer fabricated from a polymeric material disposed about said spindle and adjacent said hub plate for engaging said bearing plate of said bearing assembly.

2. The system of claim 1, and wherein:
   said tip stand assembly includes a tip stand frame having at least a first twistlock casting fixed to a corner thereof for selectively engaging said tip stand assembly to the transportation vehicle, and wherein
   said tip stand assembly includes at least a first sling hung from said tip stand frame for supportively engaging the tip end support region of the wind turbine blade, and wherein
   said root stand assembly includes a root stand frame having at least a first twistlock casting fixed to a corner thereof for selectively engaging said root stand assembly to the transportation vehicle.

3. The system of claim 1, and wherein:
   said root stand assembly further includes a root stand frame, and wherein
   said bearing assembly further includes a bearing plate having an opening formed therethrough for receiving said spindle, and having a cradle bearing disposed about a portion of said opening.

4. The system of claim 3, further comprising:
   a bearing pivot assembly disposed between said root stand frame and said bearing assembly to enable said bearing assembly to pivot with respect to said root stand frame, to thereby enable a range of pivotal movement of the wind turbine blade during loading, unloading, and transport thereof.

5. The system of claim 4, wherein said bearing pivot assembly further comprises:
   at least a first pivot bearing coupled to at least a first pivot pin, and at least a first pivot pin end block for retaining said at least a first pivot pin.

6. A fixture for supporting a wind turbine blade, having a mounting flange at a root end thereof, on a transportation vehicle, comprising:
   a root stand frame configured to engage the transportation vehicle;
   a bearing assembly coupled to said root stand frame;
   a mounting flange adapter having a hub assembly with a spindle configured to rotatably engage said bearing assembly, and having plural spokes extending from said hub assembly, each of said plural spokes having an attachment plate at a distal end thereof for engaging the mounting flange of the wind turbine blade, to thereby rotatably support the root end of the wind turbine blade, and
   a bearing pivot assembly coupled between said root stand frame and said bearing assembly to enable said bearing assembly to pivot with respect to said root stand frame, to thereby enable a range of pivotal movement of the wind turbine blade during loading, unloading, and transport thereof, and wherein
   said mounting flange adapter hub assembly includes a hub plate coupled between plural proximal ends of said plural spokes, and wherein said spindle extends from said hub plate, and wherein said hub plate has a plurality of indexing holes formed therethrough for selectively locating said root adapter at an angular position with respect to said root stand assembly, to thereby locate the wind turbine blade at a selected angular position with respect to the transportation vehicle, and
   a thrust washer fabricated from a polymeric material disposed about said spindle and adjacent said hub plate for engaging said bearing plate of said bearing assembly.

7. The fixture of claim 6, and wherein said root stand frame further comprises:
   at least a first twistlock casting fixed to a corner thereof for selectively engaging said root stand frame with the transportation vehicle.

8. The fixture of claim 6, and wherein said bearing assembly further comprises:
   a bearing plate having an opening formed therethrough for receiving said spindle, and
   a cradle bearing disposed about a portion of said opening.

9. The fixture of claim 6, and wherein said bearing pivot assembly further comprises:
   at least a first pivot bearing coupled to at least a first pivot pin, and at least a first pivot pin end block for retaining said at least a first pivot pin.

10. A method of supporting a wind turbine blade on a transportation vehicle, the wind turbine blade having a root end with a mounting flange and a tip end support region, by employing a tip stand assembly, a root stand assembly having a bearing assembly, and a mounting flange adapter with a hub assembly having a spindle, and having plural spokes extending from the hub assembly, each spoke having an attachment plate at a distal end thereof, the method comprising the steps of:

engaging the root stand assembly to the transportation vehicle;

engaging the tip stand assembly to the transportation vehicle;

attaching the mounting flange adapter to the mounting flange of the wind turbine blade using the plural attachment plates;

rotatably engaging the spindle of the hub assembly with the bearing assembly;

selecting a rotational position of the wind turbine blade with respect to the transportation vehicle, and supporting the wind turbine blade with the tip stand assembly along the tip end support region.

11. The method of claim 10, and wherein the said tip stand assembly and the root stand assembly each include plural twistlock casting positioned about corners thereof, the method comprising the further steps of:

engaging the root stand assembly to the transportation vehicle using a at least a first twistlock fastener, and engaging the tip stand assembly to the transportation vehicle using at least a first twistlock fastener.

12. The method of claim 10, wherein the bearing assembly includes a bearing plate with an opening formed therethrough and a cradle bearing disposed about a portion of the opening, the method comprising the further steps of:

engaging the spindle of the mounting flange adapter with the cradle bearing.

13. The method of claim 12, wherein the root stand assembly includes a root stand frame and a bearing pivot assembly disposed between the root stand frame and the bearing assembly, the method comprising the further steps of:

enabling the bearing assembly to pivot with respect to the root stand frame, thereby enabling a range of pivotal movement of the wind turbine blade during loading, unloading, and transport thereof.

14. The method of claim 10, wherein the mounting flange adapter hub includes a hub plate coupled between plural proximal ends of the plural spokes, and wherein the spindle extends from the hub plate, and wherein the hub plate has a plurality of indexing holes formed therethrough, the method comprising the further steps of:

selectively locating the mounting flange adapter at an angular position with respect to the root stand assembly, thereby locating the wind turbine blade at a selected angular position with respect to the transportation vehicle.

15. A system for supporting plural wind turbine blades on a transportation vehicle, the wind turbine blades each having a root end with a mounting flange, and a tip end support region, the system comprising:

plural tip stand assemblies, each having a sling hung therefrom adapted to support one of the plural wind turbine blades along the tip end support region, and each tip stand assembly having twistlock castings fixed to plural corners thereof for selective engagement to the transportation vehicle or for selective engagement with other tips stand assemblies;

plural root stand assemblies, each having a bearing assembly, and each having twistlock castings fixed to plural corners thereof for selective engagement to the transportation vehicle or for selective engagement with other root stand assemblies;

plural mounting flange adapters, each having a hub assembly with a spindle configured to rotatably engage said bearing assembly in a corresponding one of said plural root stand assemblies, and each having plural spokes extending from said hub assembly, each of said plural spokes having an attachment plate at a distal end thereof for engaging the mounting flange of a corresponding one of the wind turbine blades, to thereby rotatably support the root end of the wind turbine blade, and wherein said plural tip stand assemblies and said plural root stand assemblies are interconnectable to one another and to the transportation vehicle using plural twistlock fasteners.

* * * * *